United States Patent
Tsuchiya

(10) Patent No.: US 12,296,701 B2
(45) Date of Patent: May 13, 2025

(54) ELECTRICALLY POWERED VEHICLE AND METHOD OF CONTROLLING CHARGING OF ELECTRICALLY POWERED VEHICLE

(71) Applicant: TOYOTA JIDOSHA KABUSHIKI KAISHA, Aichi-ken (JP)

(72) Inventor: Yoshiyuki Tsuchiya, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 506 days.

(21) Appl. No.: 17/692,168

(22) Filed: Mar. 11, 2022

(65) Prior Publication Data

US 2022/0289057 A1 Sep. 15, 2022

(30) Foreign Application Priority Data

Mar. 15, 2021 (JP) .................. 2021-041588

(51) Int. Cl.
| | |
|---|---|
| B60L 53/22 | (2019.01) |
| B60L 1/00 | (2006.01) |
| B60L 53/24 | (2019.01) |
| B60L 53/50 | (2019.01) |
| B60L 53/62 | (2019.01) |
| H02J 7/00 | (2006.01) |
| H02M 3/158 | (2006.01) |

(52) U.S. Cl.
CPC ............... B60L 53/22 (2019.02); B60L 1/00 (2013.01); B60L 53/24 (2019.02); B60L 53/50 (2019.02); B60L 53/62 (2019.02); H02J 7/007182 (2020.01); H02M 3/1582 (2013.01); B60L 2210/12 (2013.01); B60L 2210/14 (2013.01); B60L 2210/30 (2013.01); H02J 7/0049 (2020.01); H02J 2207/20 (2020.01)

(58) Field of Classification Search
CPC ................................. B60L 53/62; B60L 53/22
USPC ........................................................ 320/109
See application file for complete search history.

(56) References Cited

U.S. PATENT DOCUMENTS

| | | | | |
|---|---|---|---|---|
| 2013/0257375 | A1* | 10/2013 | Ang ..................... | B60L 58/12 |
| | | | | 320/109 |
| 2016/0207403 | A1* | 7/2016 | Iida .................... | H02M 3/04 |
| 2016/0325636 | A1* | 11/2016 | Masuda ................ | B60L 53/18 |
| 2018/0138730 | A1* | 5/2018 | Fuchs ................... | B60L 53/14 |
| 2019/0070971 | A1 | 3/2019 | Kusumi et al. | |
| 2019/0359072 | A1* | 11/2019 | Takeda ................. | B60L 1/00 |

(Continued)

FOREIGN PATENT DOCUMENTS

| | | |
|---|---|---|
| CN | 108068650 A | 5/2018 |
| CN | 110979053 A | 4/2020 |
| EP | 3459786 A1 | 3/2019 |

(Continued)

*Primary Examiner* — Jerry D Robbins

(74) *Attorney, Agent, or Firm* — HAUPTMAN HAM, LLP

(57) ABSTRACT

An inter-terminal voltage obtaining unit obtains an inter-terminal voltage of a battery. A comparator compares the inter-terminal voltage with a maximum output voltage of a charger. When relation of VB≤VCmax is satisfied, an AC charging relay is switched such that output electric power from the charger is supplied to a high-voltage side of a buck-boost converter. When relation of VB>VCmax is satisfied, the AC charging relay is switched such that an output voltage of the charger is supplied to a low-voltage side of the buck-boost converter and the buck-boost converter is activated.

10 Claims, 11 Drawing Sheets

(56) References Cited

U.S. PATENT DOCUMENTS

2019/0359074 A1* 11/2019 Kume .................. B60K 17/356
2020/0106320 A1    4/2020 Okamoto et al.

FOREIGN PATENT DOCUMENTS

| JP | 2010166790 A | 7/2010 |
| JP | 201947677 A | 3/2019 |
| JP | 2020-058131 A | 4/2020 |

* cited by examiner

ELECTRICALLY POWERED VEHICLE AND METHOD OF CONTROLLING CHARGING OF ELECTRICALLY POWERED VEHICLE

This nonprovisional application is based on Japanese Patent Application No. 2021-041588 filed with the Japan Patent Office on Mar. 15, 2021, the entire contents of which are hereby incorporated by reference.

BACKGROUND

Field

The present disclosure relates to an electrically powered vehicle and particularly to an electrically powered vehicle including a power storage device chargeable by an external power supply and a method of controlling charging of an electrically powered vehicle.

Description of the Background Art

An electrically powered vehicle such as a battery electric vehicle or a plug-in hybrid electric vehicle has recently widely been used. Such an electrically powered vehicle incorporates a power storage device chargeable with electric power supplied from an external power supply. Charging of a power storage device with electric power supplied from an external power supply is also referred to as "external charging" below.

For example, Japanese Patent Laying-Open No. 2019-047677 discloses charging of a power storage device with a booster in accordance with a highest voltage provided from an external charger (a charging stand or the like) representing an external power supply.

The electrically powered vehicle disclosed in Japanese Patent Laying-Open No. 2019-047677 incorporates a power storage device adapted to an ultra high voltage (for example, 800 V). A highest voltage Vmax of electric power provided from a charging stand is compared with a predetermined reference voltage Vref. When highest voltage Vmax is equal to or lower than reference voltage Vref, an external charging mode is set to a high voltage charging mode. When highest voltage Vmax is higher than reference voltage Vref, the external charging mode is set to an ultra high voltage charging mode.

When the external charging mode is set to the high voltage charging mode, a high voltage supplied from the charging stand is boosted to an ultra high voltage (800 V) by the booster. The power storage device is charged with electric power of the boosted voltage. When the external charging mode is set to the ultra high voltage charging mode, the voltage of electric power supplied from the charging stand is ultra high (800 V), and not boosted by the booster. The power storage device is charged with electric power of the voltage that has not been boosted.

An inter-terminal voltage of the power storage device mounted on the electrically powered vehicle varies depending on a state of charge (SOC) of the power storage device. Typically, the inter-terminal voltage lowers with lowering in SOC. In the electrically powered vehicle disclosed in Japanese Patent Laying-Open No. 2019-047677, reference voltage Vref is fixed (for example, 500 V). Therefore, when highest voltage Vmax of the charging stand is equal to or lower than reference voltage Vref in spite of the inter-terminal voltage being lower than reference voltage Vref due to the low SOC of the power storage device, the high voltage charging mode is set. Then, the power storage device is charged with electric power of the voltage boosted by the booster. Thus, in the electrically powered vehicle in Japanese Patent Laying-Open No. 2019-047677, even when the power storage device can be charged without the use of the booster, the booster is activated. Then, the power storage device may be charged with electric power of the boosted voltage. Since a boost operation by the booster leads to power loss, efficiency in charging may be lowered when the power storage device is charged while the booster is active.

SUMMARY

The present disclosure was made to solve problems above, and an object thereof is to carry out external charging in which lowering in efficiency in charging can be suppressed in an electrically powered vehicle including a power storage device chargeable by an external power supply.

An electrically powered vehicle according to the present disclosure is an electrically powered vehicle including a power storage device chargeable with electric power supplied from an external power supply. The electrically powered vehicle includes a booster. The booster has a high-voltage side connected to the power storage device. The booster is configured to boost a voltage of electric power provided to a low-voltage side of the booster and to provide electric power of the boosted voltage to the high-voltage side. The electrically powered vehicle further includes a first path, a second path, a charging relay, and a controller. The first path is a path through which the electric power supplied from the external power supply is supplied to the high-voltage side of the booster. The second path is a path through which the electric power supplied from the external power supply is supplied to the low-voltage side of the booster. The charging relay selectively switches a path for the electric power supplied from the external power supply to the first path or the second path. The controller is configured to switch the charging relay to select the first path when the power storage device is charged with the electric power supplied from the external power supply and an inter-terminal voltage of the power storage device is lower than a voltage of the electric power supplied from the external power supply, and to switch the charging relay to select the second path, and to activate the booster, when the power storage device is charged with the electric power supplied from the external power supply and the inter-terminal voltage of the power storage device is higher than the voltage of the electric power supplied from the external power supply.

According to this configuration, when the power storage device is charged with electric power supplied from the external power supply and the inter-terminal voltage of the power storage device is lower than the voltage of electric power supplied from the external power supply, the charging relay is switched to select the first path. Thus, when the inter-terminal voltage of the power storage device is lower than the voltage of electric power supplied from the external power supply, electric power supplied from the external power supply is supplied to the high-voltage side of the booster. The booster has the high-voltage side connected to the power storage device and the voltage of electric power supplied from the external power supply is higher than the inter-terminal voltage of the power storage device. Therefore, the power storage device can be charged without activation of the booster. Therefore, lowering in efficiency in charging can be suppressed.

When the power storage device is charged with electric power supplied from the external power supply and the inter-terminal voltage of the power storage device is higher than the voltage of electric power supplied from the external power supply, the charging relay is switched to select the second path and the booster is activated to boost the voltage. Thus, when the voltage of electric power supplied from the external power supply is lower than the inter-terminal voltage of the power storage device, electric power supplied from the external power supply is provided to the low-voltage side of the booster and the booster is activated to boost the voltage. The power storage device can thus be charged.

Preferably, the external power supply is an alternating-current (AC) power supply that supplies AC electric power to the electrically powered vehicle. The electrically powered vehicle includes a charger that converts the AC electric power supplied from the AC power supply to direct-current (DC) electric power. The first path is a path through which the electric power provided from the charger is supplied to the high-voltage side of the booster. The second path is a path through which the electric power provided from the charger is supplied to the low-voltage side of the booster. The controller is configured to switch the charging relay to select the first path when the inter-terminal voltage of the power storage device is lower than a voltage of the electric power provided from the charger, and to switch the charging relay to select the second path, and to activate the booster, when the inter-terminal voltage of the power storage device is higher than the voltage of the electric power provided from the charger.

According to this configuration, even when the inter-terminal voltage (a rated voltage or a nominal voltage) of the power storage device is higher than an output voltage of the charger, the power storage device can be charged by using the charger without increasing the output voltage of the charger.

Preferably, the controller is configured to switch the charging relay to select the first path when the inter-terminal voltage of the power storage device is lower than an upper limit voltage which is an upper limit of the voltage provided from the charger, and to switch the charging relay to select the second path, and to activate the booster, when the inter-terminal voltage of the power storage device is higher than the upper limit voltage.

The upper limit voltage that can be provided from the charger may thus be used as the voltage of electric power provided from the charger.

Preferably, the external power supply is a DC power supply that supplies DC electric power to the electrically powered vehicle. The electrically powered vehicle includes a DC inlet that receives input of the DC electric power supplied from the DC power supply. The first path is a path through which the electric power provided to the DC inlet is supplied to the high-voltage side of the booster. The second path is a path through which the electric power provided to the DC inlet is supplied to the low-voltage side of the booster. The controller is configured to switch the charging relay to select the first path when the inter-terminal voltage of the power storage device is lower than a voltage of the DC electric power supplied from the DC power supply, and to switch the charging relay to select the second path, and to activate the booster, when the inter-terminal voltage of the power storage device is higher than the voltage of the DC electric power supplied from the DC power supply.

According to this configuration, even when the voltage of DC electric power supplied from the external power supply is lower than the inter-terminal voltage (the rated voltage or the nominal voltage) of the power storage device, the power storage device can be charged with electric power of the voltage boosted by the booster. When the voltage of DC electric power supplied from the external power supply is higher than the inter-terminal voltage of the power storage device, the power storage device is charged without the use of the booster, which can lead to suppression of lowering in efficiency in charging.

Preferably, the controller is configured to switch the charging relay to select the first path when the inter-terminal voltage of the power storage device is lower than a maximum voltage which is maximum of the voltage of the electric power supplied from the DC power supply, and to switch the charging relay to select the second path, and to activate the booster, when the inter-terminal voltage of the power storage device is higher than the maximum voltage.

The maximum voltage that can be provided from the external power supply may thus be used as the voltage of DC electric power supplied from the external power supply.

Preferably, the external power supply is an AC power supply that supplies AC electric power to the electrically powered vehicle or a DC power supply that supplies DC electric power to the electrically powered vehicle. The electrically powered vehicle includes a DC inlet, a first DC path, a second DC path, a DC charging relay, and a charger. The DC inlet receives input of the DC electric power supplied from the DC power supply. The first DC path is a path through which the electric power provided to the DC inlet is supplied to the high-voltage side of the booster. The second DC path is a path through which the electric power provided to the DC inlet is supplied to the low-voltage side of the booster. The DC charging relay selectively switches a path for the electric power supplied from the DC power supply to the first DC path or the second DC path. The charger converts the AC electric power supplied from the AC power supply to DC electric power. The first path is a path through which the electric power provided from the charger is supplied to the high-voltage side of the booster. The second path is a path through which the electric power provided from the charger is supplied to the low-voltage side of the booster.

The controller is configured to switch the DC charging relay to select the first DC path when the power storage device is charged with the DC electric power provided to the DC inlet and an inter-terminal voltage of the power storage device is lower than a voltage of the DC electric power supplied from the DC power supply, and to switch the DC charging relay to select the second DC path, and to activate the booster, when the power storage device is charged with the DC electric power provided to the DC inlet and the inter-terminal voltage of the power storage device is higher than the voltage of the DC electric power supplied from the DC power supply. The controller is configured to switch the charging relay to select the first path when the power storage device is charged with the DC electric power provided from the charger and the inter-terminal voltage of the power storage device is lower than a voltage of the electric power provided from the charger, and to switch the charging relay to select the second path, and to activate the booster, when the power storage device is charged with the DC electric power provided from the charger and the inter-terminal voltage of the power storage device is higher than the voltage of the electric power provided from the charger.

According to this configuration, the booster can be used in both of charging with DC electric power supplied from the external power supply and charging by using the charger that converts AC electric power supplied from the external power supply to DC electric power. For example, the booster may be provided in order to address a situation in which the voltage of DC electric power supplied from the external power supply is lower than the inter-terminal voltage (the rated voltage or the nominal voltage) of the power storage device. This configuration allows charging of the power storage device by using the booster without increasing an output voltage of the charger even when the inter-terminal voltage of the power storage device is higher than the output voltage of the charger.

Preferably, the controller is configured to switch the DC charging relay to select the first DC path when the power storage device is charged with the DC electric power provided to the DC inlet and the inter-terminal voltage of the power storage device is lower than a maximum voltage which is maximum of the voltage of the electric power supplied from the DC power supply, and to switch the DC charging relay to select the second DC path, and to activate the booster, when the inter-terminal voltage of the power storage device is higher than the maximum voltage. The controller is configured to switch the charging relay to select the first path when the power storage device is charged with the DC electric power provided from the charger and the inter-terminal voltage of the power storage device is lower than an upper limit voltage which is an upper limit of the voltage provided from the charger, and to switch the charging relay to select the second path, and to activate the booster, when the power storage device is charged with the DC electric power provided to the DC inlet and the inter-terminal voltage of the power storage device is higher than the upper limit voltage.

Preferably, the booster is a buck-boost converter. The buck-boost converter is configured to boost the voltage of electric power provided to the low-voltage side and provide the boosted voltage to the high-voltage side, and to lower the voltage of electric power provided to the high-voltage side and provide the lowered voltage to the low-voltage side.

According to this configuration, the buck-boost converter mounted on the electrically powered vehicle can be used as the booster.

Preferably, the vehicle further includes auxiliary machinery connected to the low-voltage side of the buck-boost converter.

According to another aspect, a method of controlling charging of an electrically powered vehicle is provided. The electrically powered vehicle includes a charger, a booster, and a power storage device. The charger converts AC electric power supplied from an external power supply to DC electric power. The booster has a high-voltage side connected to the power storage device. The booster is configured to boost a voltage of electric power provided to a low-voltage side of the booster and to provide electric power of the boosted voltage to the high-voltage side. The power storage device is chargeable with electric power provided from the charger. The method includes obtaining an inter-terminal voltage of the power storage device, comparing an upper limit voltage which is an upper limit of a voltage provided from the charger with the inter-terminal voltage, charging the power storage device by activating the booster when the inter-terminal voltage is higher than the upper limit voltage, and charging the power storage device without activation of the booster when the inter-terminal voltage is lower than the upper limit voltage.

According to the method, when the inter-terminal voltage of the power storage device is lower than the upper limit voltage that can be provided from the charger and the power storage device can be charged without the use of the booster, the power storage device is charged without the use of the booster. Therefore, the power storage device can be charged without loss in the booster and lowering in efficiency in charging can be suppressed. When the inter-terminal voltage of the power storage device is higher than the upper limit voltage that can be provided from the charger, the booster boosts the voltage, which allows charging of the power storage device with electric power of the boosted voltage.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
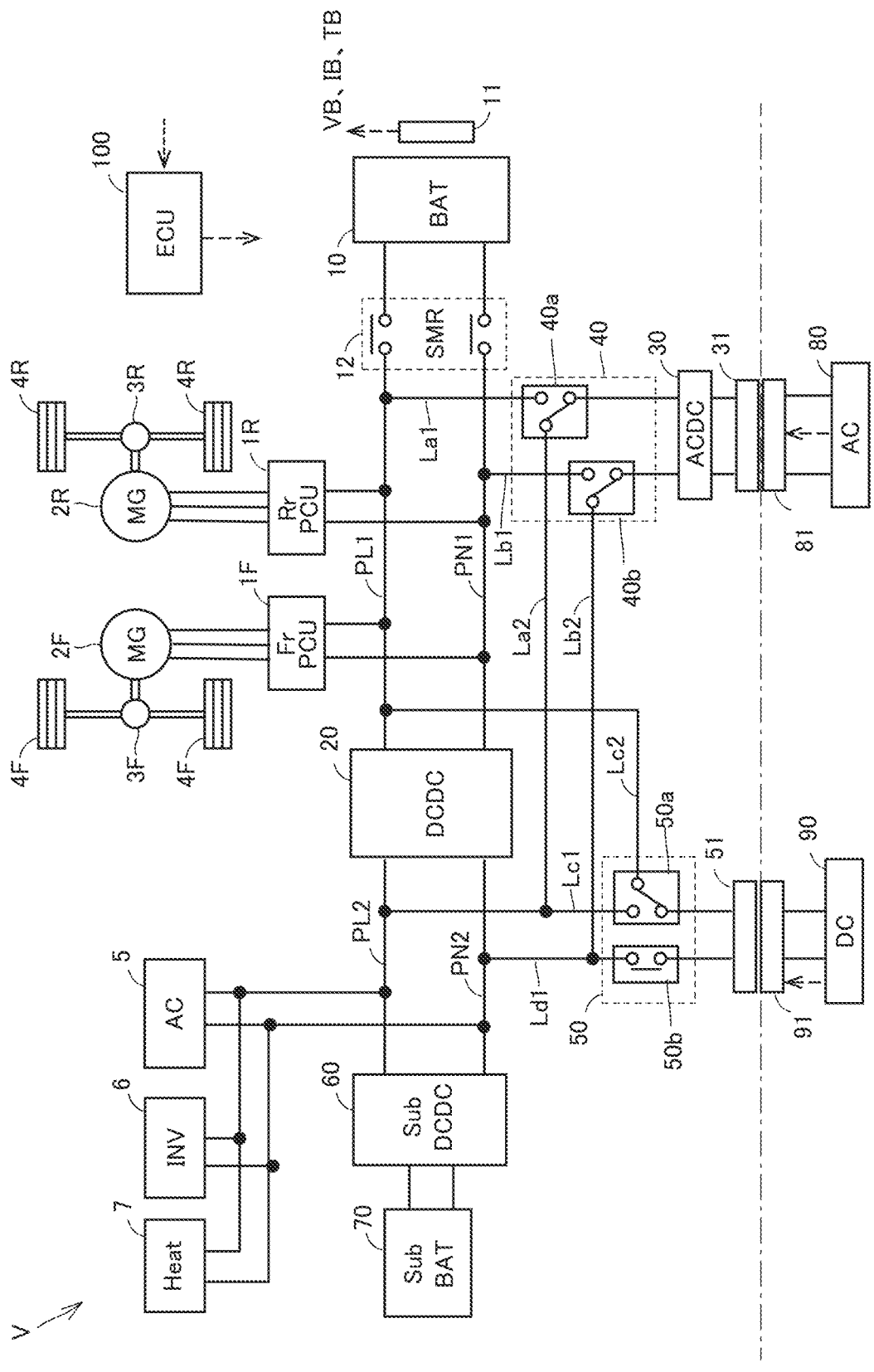
FIG. 1 is a diagram of an overall configuration of an electrically powered vehicle according to the present embodiment.

An embodiment of the present disclosure will be described in detail below with reference to the drawings. The same or corresponding elements in the drawings have the same reference characters allotted and description thereof will not be repeated.

FIG. 1 is a diagram of an overall configuration of an electrically powered vehicle according to the present embodiment. In the present embodiment, an electrically powered vehicle V is, for example, a battery electric vehicle. Electrically powered vehicle V includes power control units (PCUs) 1F and 1R, motor generators (MGs) 2F and 2R which are rotating electric machines, power transmission gears 3F and 3R, drive wheels 4F and 4R, a battery 10 representing an exemplary power storage device, a monitoring unit 11, a system main relay (SMR) 12, and an electronic control unit (ECU) 100 representing an exemplary controller.

MG 2F and MG 2R are each implemented, for example, by an interior permanent magnet synchronous motor (IPM motor), and perform a function as an electric motor (motor) and a function as an electric power generator (generator). Output torque of MG 2F is transmitted to drive wheels 4F as front wheels through power transmission gear 3F including a reduction gear, a differential, and the like. Similarly, output torque of MG 2R is transmitted to drive wheels 4R as rear wheels through power transmission gear 3R including a reduction gear, a differential, and the like.

During braking of electrically powered vehicle V, drive wheels 4F which are the front wheels drive MG 2F, and MG 2F operates as the electric power generator. MG 2F thus functions also as a braking apparatus that carries out regenerative braking for converting kinetic energy of electrically powered vehicle V into electric power. Regenerated electric power generated from regenerative braking force in MG 2F is stored in battery 10. Similarly, MG 2R also operates as the electric power generator during braking of electrically powered vehicle V and regenerated electric power generated from regenerative braking force is stored in battery 10.

PCU 1F is a power conversion device that bidirectionally converts electric power between MG 2F and battery 10. PCU 1F includes, for example, an inverter and a converter that operate based on a control signal from ECU 100.

During discharging of battery 10, the converter boosts a voltage supplied from battery 10 and supplies the boosted voltage to the inverter. The inverter converts DC electric power supplied from the converter to AC electric power and drives MG 2F with resultant electric power.

During charging of battery 10, on the other hand, the inverter converts AC electric power generated by MG 2F to DC electric power and supplies resultant electric power to the converter. The converter lowers the voltage supplied from the inverter to a voltage suitable for charging of battery 10 and supplies the lowered voltage to battery 10.

PCU 1F stops charging and discharging by stopping operations of the inverter and the converter based on a control signal from ECU 100. The converter does not have to be provided in PCU 1F.

PCU 1R is a power conversion device that bidirectionally converts electric power between MG 2R and battery 10. Though description of the configuration and functions of PCU 1R is not provided, the configuration and the functions are similar to those of PCU 1F.

SMR 12 is electrically connected to a power line PL1 and a power line PN1. Power line PL1 connects battery 10 to PCU 1F and PCU 1R. When SMR 12 is closed (ON) (that is, in a conducting state) in accordance with a control signal from ECU 100, electric power can be supplied and received between battery 10, and PCU 1F and PCU 1R. When SMR 12 is opened (OFF) (that is, in a disconnected state) in accordance with a control signal from ECU 100, electrical connection between battery 10, and PCU 1F and PCU 1R is cut off. In external charging of battery 10, SMR 12 is closed (ON) in accordance with a signal from ECU 100.

Electric power for driving MG 2F and MG 2R is stored in battery 10. Battery 10 is a rechargeable DC power supply (secondary battery). A plurality of cells (battery cells) are stacked in battery 10, and for example, these cells are electrically connected in series. The cell may be a lithium ion battery or a nickel metal hydride battery. Battery 10 may be substituted with a power storage device such as an electric double layer capacitor.

Monitoring unit 11 includes a voltage sensor, a current sensor, and a temperature sensor (none of which is shown). The voltage sensor detects a voltage VB across terminals of battery 10. The current sensor detects a current IB which is an input and output current to and from battery 10. The temperature sensor detects a temperature TB of battery 10. Each sensor provides a result of detection to ECU 100.

Buck-boost converter 20 is, for example, a non-insulating buck-boost converter. Buck-boost converter 20 boosts a voltage of electric power supplied to a power line PL2 and a power line PN2 on a low-voltage side. Buck-boost converter 20 provides the boosted voltage to power line PL1 and power line PN1 on the high-voltage side. Buck-boost converter 20 lowers a voltage of electric power provided to power lines PL1 and PN1 on the high-voltage side. Buck-boost converter 20 provides the lowered voltage to power lines PL2 and PN2 on the low-voltage side. Buck-boost converter 20 may be, for example, a buck-boost DCDC converter.

Auxiliary machinery is connected to power lines PL2 and PN2 on the low-voltage side. The auxiliary machinery includes an electric compressor 5 of an air-conditioning apparatus (an air-conditioner), an inverter 6 for a receptacle in a vehicle compartment, and a heater 7. Inverter 6 for the receptacle in the vehicle compartment supplies AC 100V to the receptacle in the vehicle compartment. A sub battery 70 is connected to power lines PL2 and PN2 with a buck converter 60 being interposed. Sub battery 70 is a power supply for ECU 100, a not-shown human machine interface (HMI) device, or another piece of auxiliary machinery.

In the present embodiment, a voltage (a rated voltage or a nominal voltage) of battery 10 is 800 V, and a voltage (a rated voltage or a nominal voltage) of sub battery 70 is 12 V. Buck-boost converter 20 lowers the voltage of electric power at 800 V discharged from battery 10 to power lines PL1 and PN1 to 400 V. Buck-boost converter 20 provides the lowered voltage to power line PL2 and power line PN2. The auxiliary machinery connected to power lines PL2 and PN2 on the low-voltage side includes electric compressor 5 of an air-conditioning apparatus (an air-conditioner), inverter 6 for a receptacle in a vehicle compartment, and heater 7. The auxiliary machinery is activated with electric power of battery 10, a voltage of which has been lowered to 400 V by buck-boost converter 20. Buck converter 60 lowers the voltage of electric power of battery 10, a voltage of which has been lowered to 400 V by buck-boost converter 20, to 12 V, and charges sub battery 70 with electric power of the lowered voltage. Buck converter 60 may be a buck DCDC converter.

Electrically powered vehicle V includes a DC inlet 51, and quick charge of battery 10 can be carried out by using an external DC power supply which is a charging facility. DC inlet 51 is configured to be connected to a connector 91 provided at a tip end of a charging cable of an external DC power supply (a DC charging facility) 90.

DC charging relay 50 selectively switches a path for electric power supplied from DC inlet 51 to power line PL1 and power line PN1 on the high-voltage side of buck-boost converter 20 which is the booster or to power line PL2 and power line PN2 on the low-voltage side. DC charging relay 50 includes, for example, a c contact relay 50a and an a contact relay 50b. c contact relay 50a is configured to be switched between a first position and a second position in accordance with a control signal from ECU 100. When c contact relay 50a is at the first position, electric power supplied to DC inlet 51 is supplied to power line PL1 on the high-voltage side through a power line Lc2. When c contact relay 50a is at the second position, electric power supplied to DC inlet 51 is supplied to power line PL2 on the low-voltage side through a power line Lc1. a contact relay 50b is closed (ON) or opened (OFF) in accordance with a control signal from ECU 100. When a contact relay 50b is closed, electric power supplied to DC inlet 51 is supplied to power line PN2 on the low-voltage side through a power line Ld1. When a contact relay 50*b* is opened, electrical connection between DC inlet 51 and power line PN2 is cut off.

Figure 2:
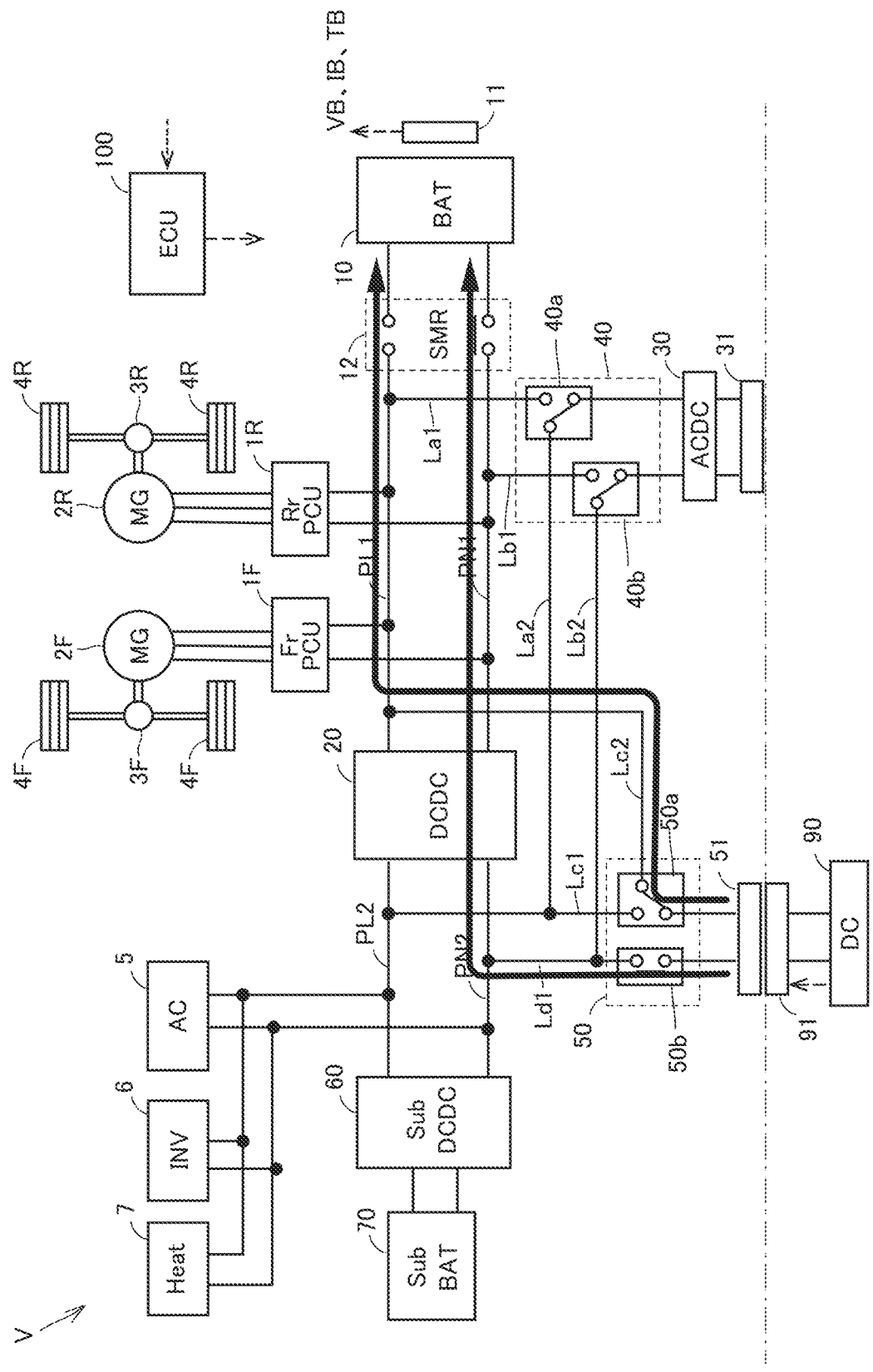
FIG. 2 is a diagram showing a flow of electric power when a c contact relay 50a is switched to a first position and an a contact relay 50b is closed.

FIG. 2 is a diagram showing a flow of electric power when c contact relay 50*a* is switched to the first position and a contact relay 50*b* is closed. Buck-boost converter 20 is a non-insulating buck-boost converter. Power line PN1 on the high-voltage side which is a negative electrode line and power line PN2 on the low-voltage side which is a negative electrode line are connected to each other (these power lines are substantially identical). Therefore, when c contact relay 50*a* is switched to the first position and a contact relay 50*b* is closed, electric power supplied to DC inlet 51 can be supplied to battery 10 through power line PL1 and power line PN1 on the high-voltage side as shown with arrows in FIG. 2.

Figure 3:
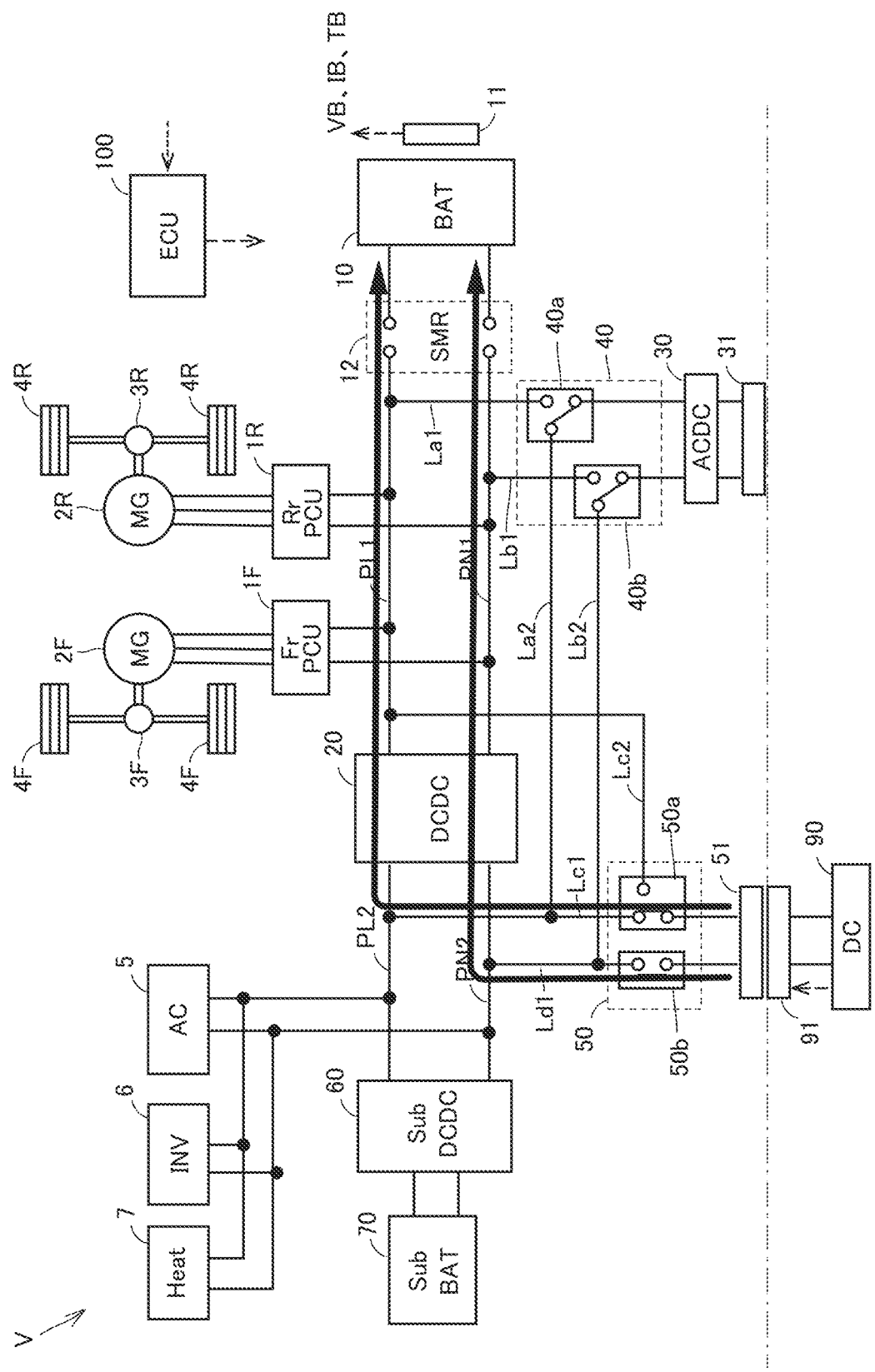
FIG. 3 is a diagram showing a flow of electric power when c contact relay 50a is switched to a second position and a contact relay 50b is closed.

FIG. 3 is a diagram showing a flow of electric power when c contact relay 50*a* is switched to the second position and a contact relay 50*b* is closed. When c contact relay 50*a* is switched to the second position and a contact relay 50*b* is closed, electric power supplied to DC inlet 51 can be provided to buck-boost converter 20 through power line PL2 and power line PN2 on the low-voltage side as shown with arrows in FIG. 3. Electric power of the voltage boosted by buck-boost converter 20 can thus be supplied to battery 10.

Referring to FIG. 1, DC charging facility 90 is configured to convert AC electric power from a grid power supply (for example, a commercial power supply) to DC electric power. DC charging facility 90 is configured to provide charging electric power which is converted DC electric power to electrically powered vehicle V through the charging cable from connector 91. When connector 91 of DC charging facility 90 is connected to DC inlet 51, a signal line (not shown) in addition to the power line is connected. Such connection allows communication between DC charging facility 90 and ECU 100 through controller area network (CAN) communication and/or power line communication (PLC).

Electrically powered vehicle V includes an AC inlet 31, and standard charge of battery 10 can be carried out by using an external AC power supply which is a charging facility. AC inlet 31 is configured to be connected to a connector 81 provided at a tip end of a charging cable of an external AC power supply (AC charging facility) 80.

AC electric power supplied from AC charging facility 80 to AC inlet 31 is converted to DC electric power by a charger 30 which is a boost ACDC converter. The voltage of AC electric power is boosted by charger 30. The boosted voltage is provided as a voltage of DC electric power.

AC charging relay 40 selectively switches a path for electric power provided from charger 30 to power line PL1 and power line PN1 on the high-voltage side of buck-boost converter 20 or power line PL2 and power line PN2 on the low-voltage side. AC charging relay 40 includes, for example, a c contact relay 40*a* and a c contact relay 40*b*. c contact relay 40*a* is configured to be switched between the first position and the second position in accordance with a control signal from ECU 100. When c contact relay 40*a* is at the first position, electric power provided from charger 30 is supplied to power line PL1 on the high-voltage side through a power line La1. When c contact relay 40*a* is at the second position, electric power provided from charger 30 is supplied to power line PL2 on the low-voltage side through a power line La2 and power line Lc1. c contact relay 40*b* is configured to be switched between the first position and the second position in accordance with a control signal from ECU 100. When c contact relay 40*b* is at the first position, electric power provided from charger 30 is supplied to power line PN1 on the high-voltage side through a power line Lb1. When c contact relay 40*b* is at the second position, electric power provided from charger 30 is supplied to power line PN2 on the low-voltage side through a power line Lb2 and power line Ld1.

Figure 4:
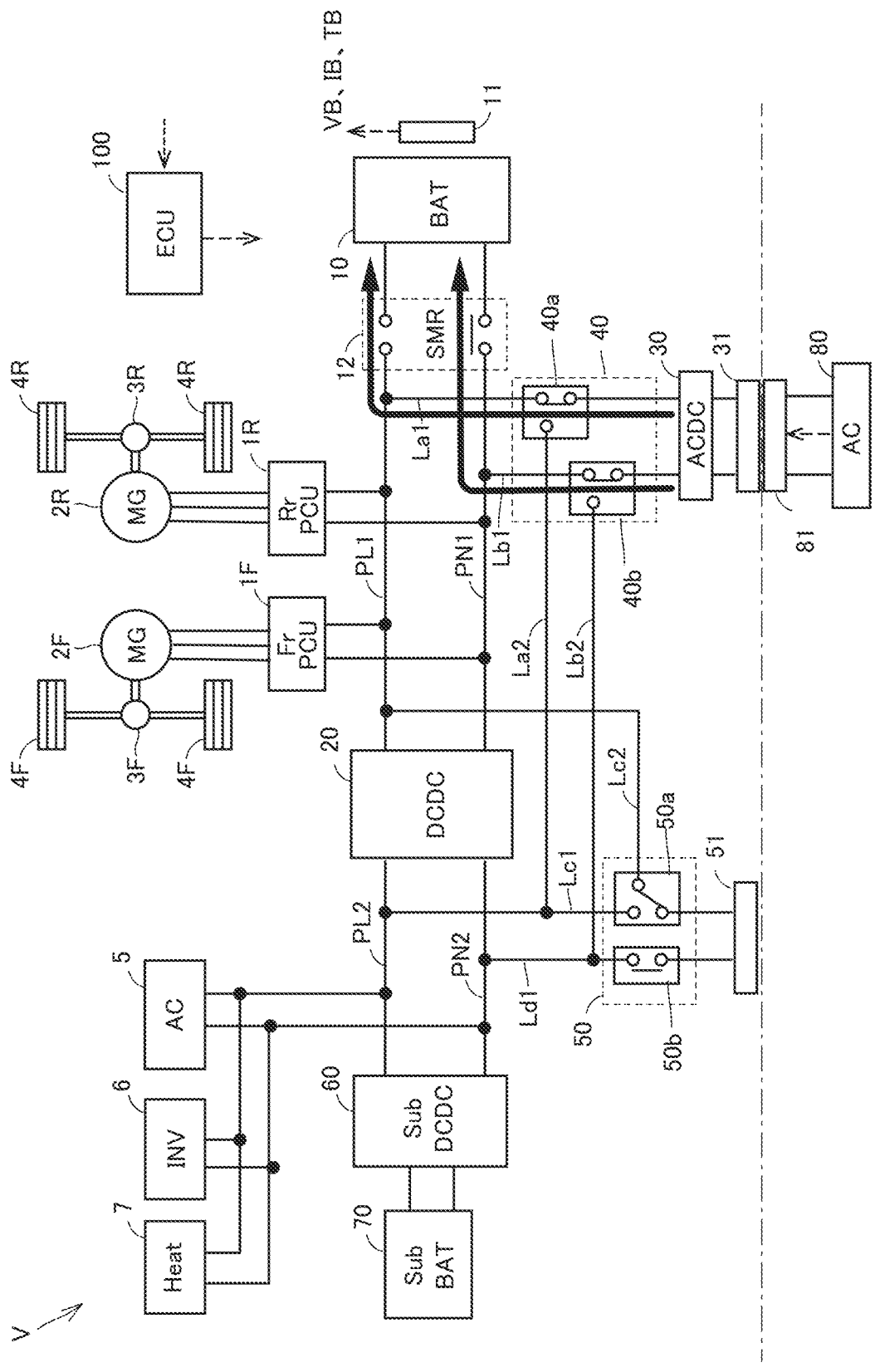
FIG. 4 is a diagram showing a flow of electric power when an AC charging relay 40 (a c contact relay 40a and a c contact relay 40b) is switched to the first position.

FIG. 4 is a diagram showing a flow of electric power when AC charging relay 40 (c contact relay 40*a* and c contact relay 40*b*) is switched to the first position. When AC charging relay 40 is switched to the first position, electric power provided from charger 30 can be supplied to battery 10 through power line PL1 and power line PN1 on the high-voltage side as shown with arrows in FIG. 4.

Figure 5:
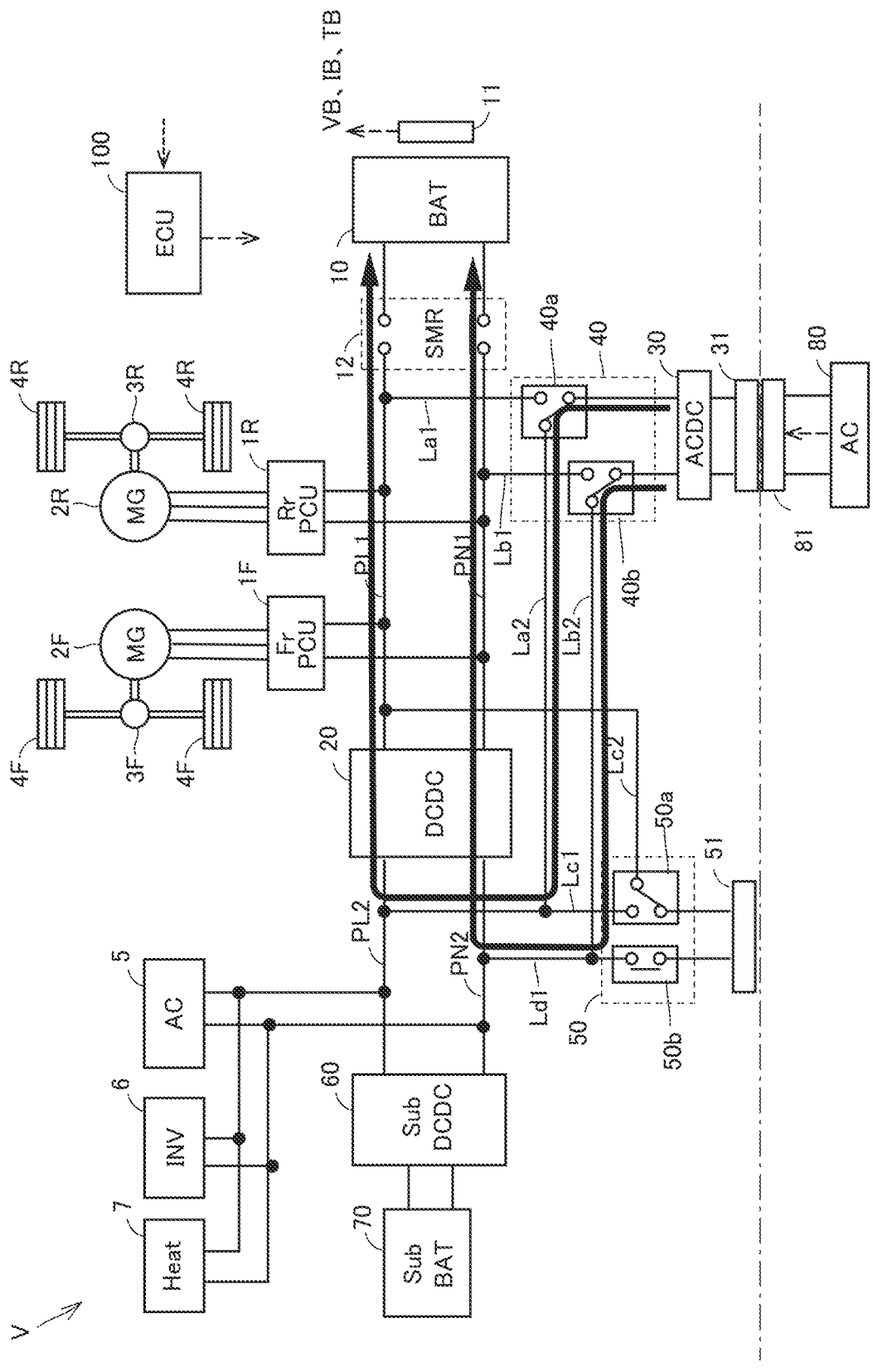
FIG. 5 is a diagram showing a flow of electric power when AC charging relay 40 (c contact relay 40a and c contact relay 40b) is switched to the second position.

FIG. 5 is a diagram showing a flow of electric power when AC charging relay 40 (c contact relay 40*a* and c contact relay 40*b*) is switched to the second position. When AC charging relay 40 is switched to the second position, electric power provided from charger 30 can be supplied to power line PL2 and power line PN2 on the low-voltage side as shown with arrows in FIG. 5. Electric power of the voltage boosted by buck-boost converter 20 can thus be supplied to battery 10.

Referring to FIG. 1, AC charging facility 80 is configured to convert AC electric power from the system power supply (for example, the commercial power supply). AC charging facility 80 is configured to provide charging electric power which is converted electric power to electrically powered vehicle V from connector 81 through the charging cable. When connector 81 of AC charging facility 80 is connected to AC inlet 31, a signal line (not shown) in addition to the power line is connected. Such connection allows communication between AC charging facility 80 and ECU 100 through CAN communication and/or PLC. AC charging facility 80 supplies, for example, electric power of single-phase AC 200 V to charger 30 through connector 81.

ECU 100 includes a central processing unit (CPU) and a memory. The memory includes a read only memory (ROM) and a random access memory (RAM). ECU 100 controls each device such that electrically powered vehicle V is in a desired state based on a signal received from monitoring unit 11, signals from various sensors (not shown), and information such as a map and a program stored in the memory. Signals from the various sensors include an accelerator position signal and a vehicle speed signal. ECU 100 calculates the SOC of battery 10 based on a detection value of an input and output current to and from battery 10 and/or a voltage of battery 10 from monitoring unit 11. The SOC of battery 10 represents an amount of power storage in battery 10, and it is expressed, for example, by a percentage as a ratio of a current amount of power storage to a full charge capacity of battery 10.

Though specifications of DC charging facility 90 as a charging infrastructure are defined under international standards, there are various specifications for a maximum output voltage of DC charging facility 90. For example, when battery 10 in the present embodiment is charged by using DC charging facility 90 having a maximum output voltage of 400 V, buck-boost converter 20 boosts 400 V which is the voltage of electric power supplied from DC charging facility 90 to 800 V, and charges battery 10 with electric power of the boosted voltage. When battery 10 in the present embodiment is charged by using the DC charging facility having a maximum output voltage of 800 V, battery 10 is charged without activation of buck-boost converter 20.

Specifically, when connector 91 of DC charging facility 90 is connected to DC inlet 51, a maximum output voltage VDCmax of DC charging facility 90 is obtained from information received from DC charging facility 90 through CAN communication or PLC. When obtained maximum output voltage VDCmax is lower than 800 V, c contact relay 50a is switched to the second position and a contact relay 50b is closed. Then, as shown in FIG. 3, buck-boost converter 20 is activated and the voltage of electric power supplied from DC charging facility 90 is boosted to 800 V, and battery 10 is charged therewith. When obtained maximum output voltage VDCmax is equal to or higher than 800 V, c contact relay 50a is switched to the first position and a contact relay 50b is closed. Thus, as shown in FIG. 2, battery 10 is charged with electric power supplied from DC charging facility 90 without activation by buck-boost converter 20.

In the present embodiment, charger 30 is an ACDC converter configured to convert electric power of single-phase AC supplied from AC charging facility 80 to a DC current and to provide resultant DC electric power. Charger 30 boosts 200 V which is a voltage of single-phase AC to 400 V and provides the boosted voltage as the voltage of DC electric power. The ACDC converter capable of boosting the voltage of single-phase AC to 800 V can also be employed as the charger for charging battery 10. In doing so, however, the charger should withstand a high voltage and increases in size. Therefore, in the present embodiment, charger 30 capable of boosting the voltage of single-phase AC to 400 V is employed.

The voltage of electric power provided from charger 30 in the present embodiment is 400 V at the maximum. Therefore, the voltage of electric power provided from charger 30 is boosted by buck-boost converter 20 and battery 10 is charged therewith. A boost operation by buck-boost converter 20 causes loss such as switching loss and conduction loss. When 400 V which is the voltage of electric power provided from charger 30 is boosted and then charging is carried out, efficiency in charging is lowered. Inter-terminal voltage VB of battery 10 varies depending on the SOC. With lowering in SOC, the inter-terminal voltage lowers. Therefore, inter-terminal voltage VB of battery 10 may become equal to or lower than 400 V. Therefore, in external charging with electric power provided from charger 30, depending on the inter-terminal voltage of battery 10, battery 10 can be charged without the use of the boost function of buck-boost converter 20.

In the present embodiment, when inter-terminal voltage VB of battery 10 is higher than an output voltage of charger 30, the voltage of output electric power from charger 30 is boosted by buck-boost converter 20, and battery 10 is charged with electric power of the boosted voltage. Then, when inter-terminal voltage VB is lower than the output voltage of charger 30, battery 10 is charged without activation of buck-boost converter 20. Lowering in efficiency in charging can thus be suppressed.

Figure 6:
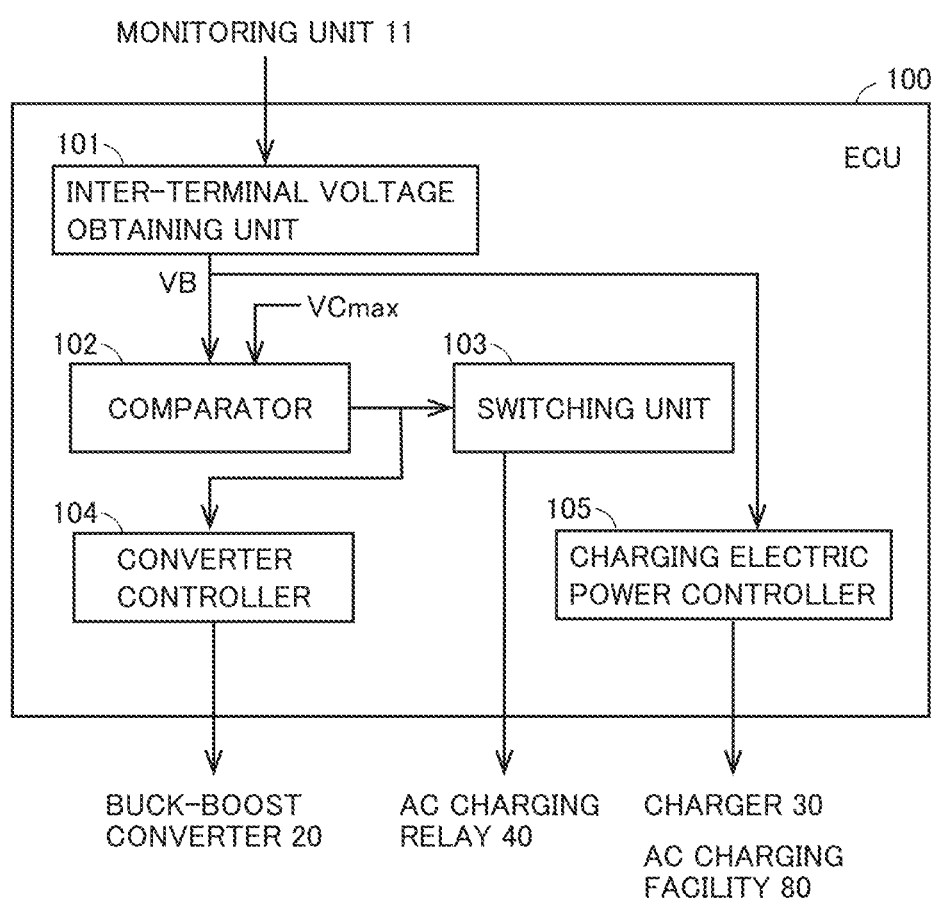
FIG. 6 is a diagram showing a functional block configured within an ECU 100.

FIG. 6 is a diagram showing a functional block configured within ECU 100. Each functional block is implemented by hardware of ECU 100 and software processing performed by a program. An inter-terminal voltage obtaining unit 101 obtains inter-terminal voltage VB of battery 10 from monitoring unit 11. A comparator 102 compares inter-terminal voltage VB obtained by inter-terminal voltage obtaining unit 101 with a maximum output voltage VCmax of charger 30. Comparator 102 provides a result of comparison to a switching unit 103 and a converter controller 104. In the present embodiment, maximum output voltage VCmax is set to 400 V and stored in advance in the memory.

Switching unit 103 receives the result of comparison from comparator 102 and switches AC charging relay 40 based on the result of comparison. When inter-terminal voltage VB is equal to or lower than maximum output voltage VCmax (VB≤VCmax), AC charging relay 40 is switched to the first position and battery 10 can be charged with output electric power from charger 30 through power line PL1 and power line PN1 on the high-voltage side (see FIG. 4). When inter-terminal voltage VB is higher than maximum output voltage VCmax (VB>VCmax), AC charging relay 40 is switched to the second position and output electric power from charger 30 is supplied to power line PL2 and power line PN2 on the low-voltage side (see FIG. 5).

Converter controller 104 receives the result of comparison from the comparator. When inter-terminal voltage VB is higher than maximum output voltage VCmax (VB>VCmax) in the result of comparison, converter controller 104 activates buck-boost converter 20 simultaneously with start of charging of battery 10.

A charging electric power controller 105 controls, for example, start and end of charging of battery 10. By way of example, when two-way authentication between the electrically powered vehicle and AC charging facility 80 is successful, charging electric power controller 105 transmits a request for output of charging electric power to AC charging facility 80 and activates charger 30, to thereby start charging of battery 10. After start of charging, when the SOC of battery 10 attains to an SOC at the time of completion of charging, charging electric power controller 105 transmits a request for stopping charging electric power to AC charging facility 80 and deactivates charger 30, to thereby quit charging. When AC charging facility 80 is, for example, a household wall socket, communication with AC charging facility 80 is not established.

Figure 7:
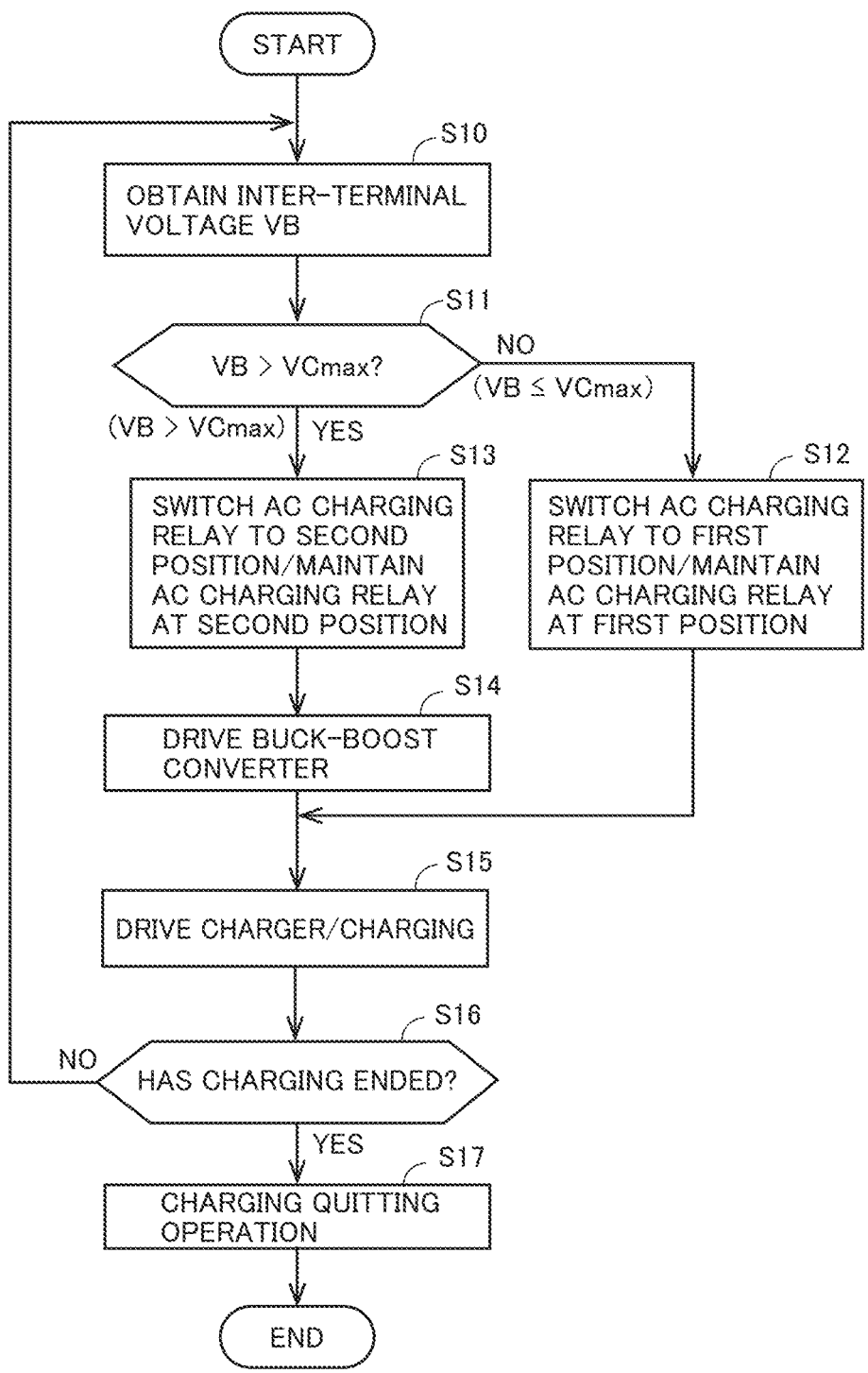
FIG. 7 is a schematic flowchart of processing performed by ECU 100.

FIG. 7 is a flowchart showing overview of processing performed by ECU 100. This flowchart is performed when connector 81 is connected to AC inlet 31. When connector 81 is connected to AC inlet 31, initially, in step (the step being abbreviated as S below) 10, ECU 100 receives a signal from monitoring unit 11 and obtains inter-terminal voltage VB of battery 10 from that signal. The process proceeds to S11.

In S11, ECU 100 determines whether or not inter-terminal voltage VB is higher than maximum output voltage VCmax of charger 30. Maximum output voltage VCmax of charger 30 is written in the memory in advance based on specifications of charger 30, and it is set to 400 V in the present embodiment. When inter-terminal voltage VB is equal to or lower than maximum output voltage VCmax (VB≤VCmax), determination as NO is made and the process proceeds to S12. Maximum output voltage VCmax corresponds to the "upper limit voltage" in the present disclosure.

In S12, ECU 100 switches AC charging relay 40 (c contact relay 40a and c contact relay 40b) to the first position (when the AC charging relay has been set to the first position, the first position is maintained), and the process proceeds to S15. Thus, electric power provided from charger 30 can be supplied to power line PL1 and power line PN1 on the high-voltage side of buck-boost converter 20 through power line La1 and power line Lb1. Power line La1 and power line Lb1 correspond to the "first path" in the present disclosure.

When inter-terminal voltage VB is higher than maximum output voltage VCmax (VB>VCmax) in S11, determination as YES is made and the process proceeds to S13. In S13, ECU 100 switches AC charging relay 40 (c contact relay 40a and c contact relay 40b) to the second position (when the AC charging relay has been set to the second position, the second position is maintained), and the process proceeds to S14. Thus, electric power provided from charger 30 can be supplied to power line PL2 and power line PN2 on the low-voltage side of buck-boost converter 20 through power line La2, power line Lc1, power line Lb2, and power line Ld1. Power line La2, power line Lc1, power line Lb2, and power line Ld1 correspond to the "second path" in the present disclosure.

In S14, ECU 100 activates buck-boost converter 20. Thus, the voltage of electric power provided to power line PL2 and power line PN2 on the low-voltage side is boosted and electric power of the boosted voltage can be provided to power lines PL1 and PN1 on the high-voltage side.

In S15, ECU 100 transmits a request for output to AC charging facility 80 and activates charger 30 to carry out charging (while electric power is being supplied from AC charging facility 80, supply of electric power is continued). Charging of battery 10 may be constant current (CC) charging or constant current, constant voltage (CCCV) charging.

In following S16, ECU 100 determines whether or not charging of battery 10 has ended. For example, when the SOC of battery 10 attains to a charging completion SOC, ECU 100 determines that charging has ended. The charging completion SOC may be set to any value by a user. When the charging completion SOC has not been set by the user, it may be set to a default value (for example, 90%). When it is determined that charging has not ended, the process proceeds to S10 and processing in S10 to S16 is repeatedly performed. When the SOC of battery 10 attains to the charging completion SOC and determination as YES is made in S16, the process proceeds to S17.

After ECU 100 performs a charging quitting operation in S17, ECU 100 quits the present routine. The charging quitting operation is, for example, transmission of a request for stopping charging electric power to AC charging facility 80 for stopping supply of electric power from AC charging facility 80 and deactivation of charger 30. When AC charging relay 40 has been switched to the first position in S12, ECU 100 switches AC charging relay 40 to the second position. When ECU 100 has activated buck-boost converter 20 in S14, it deactivates buck-boost converter 20.

According to the present embodiment, when the SOC of battery 10 is low and inter-terminal voltage VB is equal to or lower than maximum output voltage VCmax of charger 30, AC charging relay 40 is switched to the first position. Electric power provided from charger 30 is thus supplied to power lines PL1 and PN1 on the high-voltage side of buck-boost converter 20. Since maximum output voltage VCmax is higher than inter-terminal voltage VB, battery 10 can be charged with output electric power from charger 30 without activation of buck-boost converter 20. Thus, when battery 10 can be charged without the use of the boost function of buck-boost converter 20, charging is carried out without the use of buck-boost converter 20. Consequently, battery 10 can be charged without loss in buck-boost converter 20 and lowering in efficiency in charging can be suppressed.

When charging of battery proceeds and the SOC becomes high or when the SOC at the time of start of charging is high, inter-terminal voltage VB is higher than maximum output voltage VCmax. In this case, AC charging relay 40 is switched to the second position. Electric power provided from charger 30 is thus supplied to power lines PL2 and PN2 on the low-voltage side of buck-boost converter 20. Then, the voltage of output electric power from charger 30 is boosted by buck-boost converter 20, and electric power of the boosted voltage is supplied to battery 10 and charging is carried out. Thus, when the output voltage of charger 30 is lower than inter-terminal voltage VB, battery 10 can be charged by using the boost function of buck-boost converter 20.

In the present embodiment, when inter-terminal voltage VB is equal to or lower than maximum output voltage VCmax (VB≤VCmax) in S11, AC charging relay 40 is switched to the first position in S12. When inter-terminal voltage VB is lower than maximum output voltage VCmax (VB<VCmax), however, AC charging relay 40 may be switched to the first position. When inter-terminal voltage VB is equal to or higher than maximum output voltage VCmax (VB≥VCmax), on the other hand, AC charging relay 40 is switched to the second position.

Figure 8:
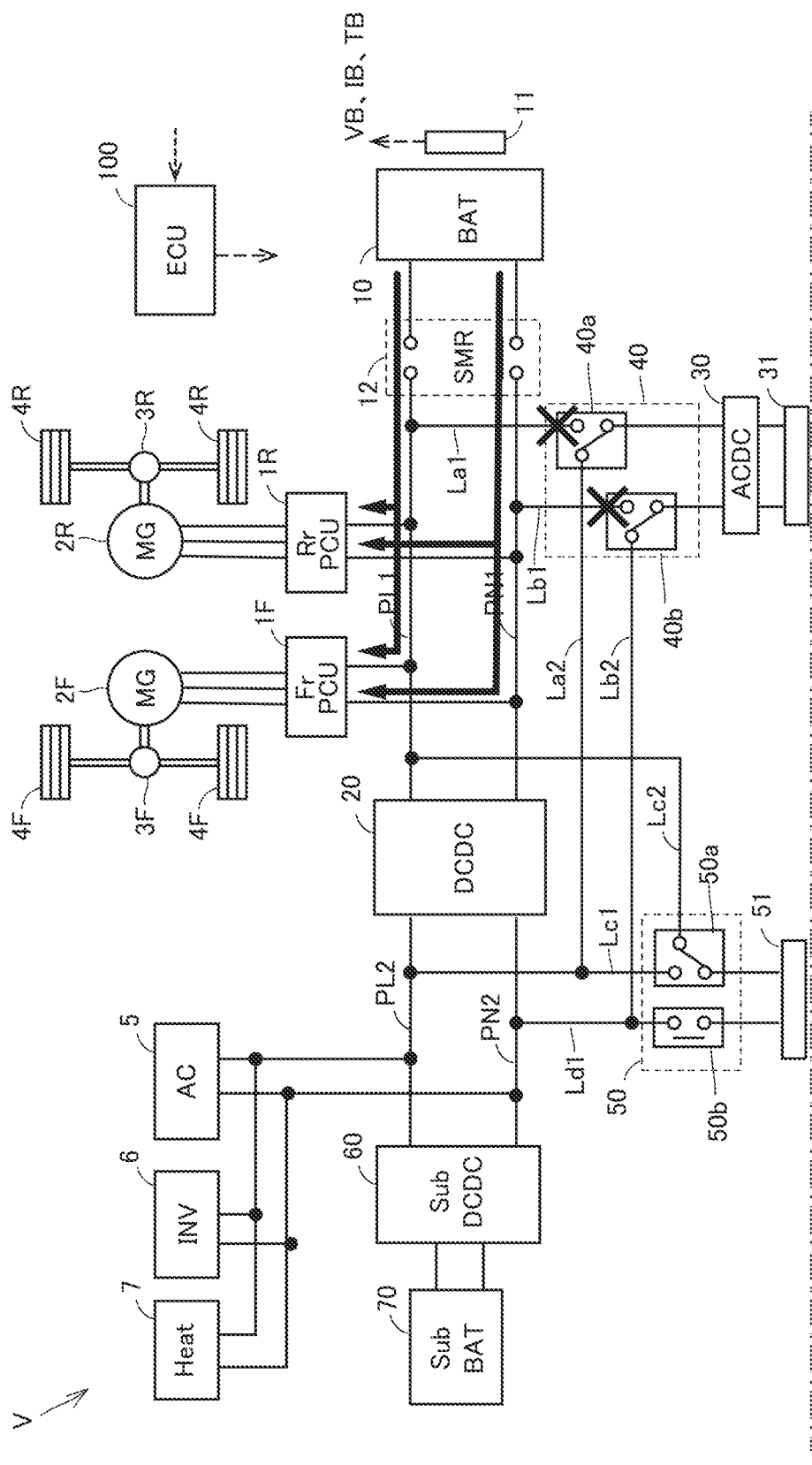
FIG. 8 is a diagram showing a flow of electric power while an electrically powered vehicle V travels.

In the present embodiment, in the charging quitting operation in S17, AC charging relay 40 is switched to the second position. FIG. 8 is a diagram showing a flow of electric power while electrically powered vehicle V travels. While electrically powered vehicle V travels, electric power discharged from battery 10 is supplied to MG 2F and MG 2R by PCU 1F and PCU 1R as shown with arrows in FIG. 8, respectively. At this time, AC charging relay 40 has been switched to the second position. Therefore, electric power discharged from battery 10 is cut off by AC charging relay 40 and is not supplied to charger 30 as shown in FIG. 8. Application of a voltage equal to or higher than a withstand voltage to charger 30 can thus be prevented.

In the present embodiment, buck-boost converter 20 performs a "function to boost the voltage of electric power supplied from DC charging facility 90 and to charge battery 10 with electric power of the boosted voltage," a "function to boost the voltage of output electric power from charger 30 and to charge battery 10 with electric power of the boosted voltage," and a "function to lower electric power discharged from battery 10 and to supply electric power of the lowered voltage to the auxiliary machinery." Buck-boost converter 20 thus collectively achieves the functions. Consequently, a circuit configuration can relatively be simplified.

In the present embodiment, maximum output voltage VCmax of charger 30 is compared with inter-terminal voltage VB. An output voltage VC of charger 30, however, may be compared with inter-terminal voltage VB and AC charging relay 40 may be switched. Then, when relation of inter-terminal voltage VB≤output voltage VC (or VB<VC) is satisfied, AC charging relay 40 is switched to the first position, and when relation of inter-terminal voltage VB>output voltage VC (or VB≥VC) is satisfied, AC charging relay 40 is switched to the second position.

Modification

In the embodiment, when maximum output voltage VDCmax of DC charging facility 90 is lower than 800 V which is the voltage (the rated voltage or the nominal voltage) of battery 10 during charging by using DC charging facility 90, battery 10 is charged by using buck-boost converter 20. When maximum output voltage VDCmax is equal to or higher than 800 V, on the other hand, battery 10 is charged without the use of buck-boost converter 20.

In this modification, as in charging by using charger 30 (AC charging facility 80), inter-terminal voltage VB of battery 10 and maximum output voltage VDCmax are compared with each other, DC charging relay 50 is switched, and charging is carried out.

Figure 9:
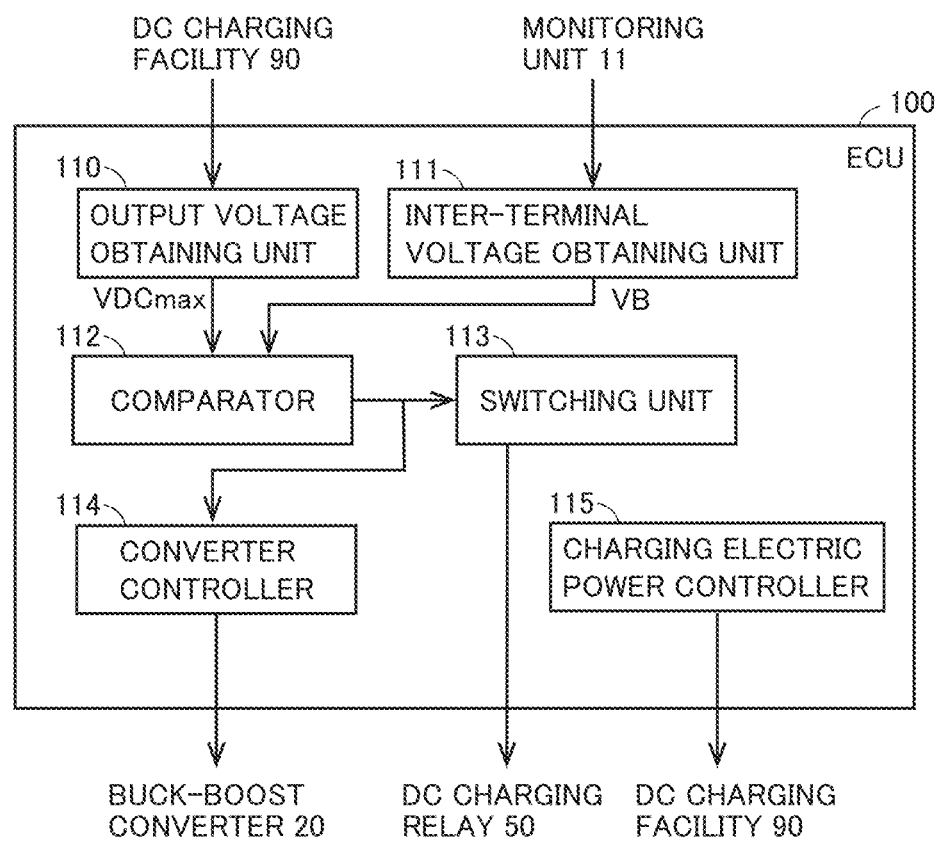
FIG. 9 is a diagram showing a functional block configured within ECU 100 in a modification.

FIG. 9 is a diagram showing a functional block configured within ECU 100 in the modification. An output voltage obtaining unit 110 receives information from DC charging facility 90 through CAN communication and/or PLC, and obtains maximum output voltage VDCmax of DC charging facility 90 from this information. Maximum output voltage VDCmax is a maximum voltage which is the maximum of the voltage provided from DC charging facility 90 in a stable manner, and it may be, for example, a rated output voltage.

An inter-terminal voltage obtaining unit 111 obtains inter-terminal voltage VB of battery 10 from monitoring unit 11. A comparator 112 compares inter-terminal voltage VB obtained by inter-terminal voltage obtaining unit 111 with maximum output voltage VDCmax obtained by output voltage obtaining unit 110. Comparator 112 provides a result of comparison to a switching unit 113 and a converter controller 114.

Switching unit 113 receives the result of comparison from comparator 112 and switches DC charging relay 50 based on the result of comparison. When inter-terminal voltage VB is equal to or lower than maximum output voltage VDCmax (VB≤VDCmax), switching unit 113 switches c contact relay 50a to the first position and closes a contact relay 50b. Battery 10 can thus be charged with electric power supplied to DC inlet 51 through power line PL1 and power line PN1 on the high-voltage side (see FIG. 2). When inter-terminal voltage VB is lower than maximum output voltage VDCmax (VB<VDCmax), switching unit 113 switches c contact relay 50a to the second position and closes a contact relay 50b. Electric power supplied to DC inlet 51 is thus supplied to power line PL2 and power line PN2 on the low-voltage side (see FIG. 3).

Converter controller 114 receives the result of comparison from comparator 112. When inter-terminal voltage VB is lower than maximum output voltage VDCmax (VB<VDCmax) in the result of comparison, converter controller 114 activates buck-boost converter 20 simultaneously with start of charging of battery 10.

A charging electric power controller 115 controls, for example, start and end of charging of battery 10. For example, when two-way authentication between the electrically powered vehicle and DC charging facility 90 is successful, charging electric power controller 115 transmits a request for output of charging electric power to DC charging facility 90 and starts charging of battery 10. After start of charging, when the SOC of battery 10 attains to the SOC at the time of completion of charging, charging electric power controller 115 transmits a request for stopping charging electric power to DC charging facility 90 and quits charging.

Figure 10:
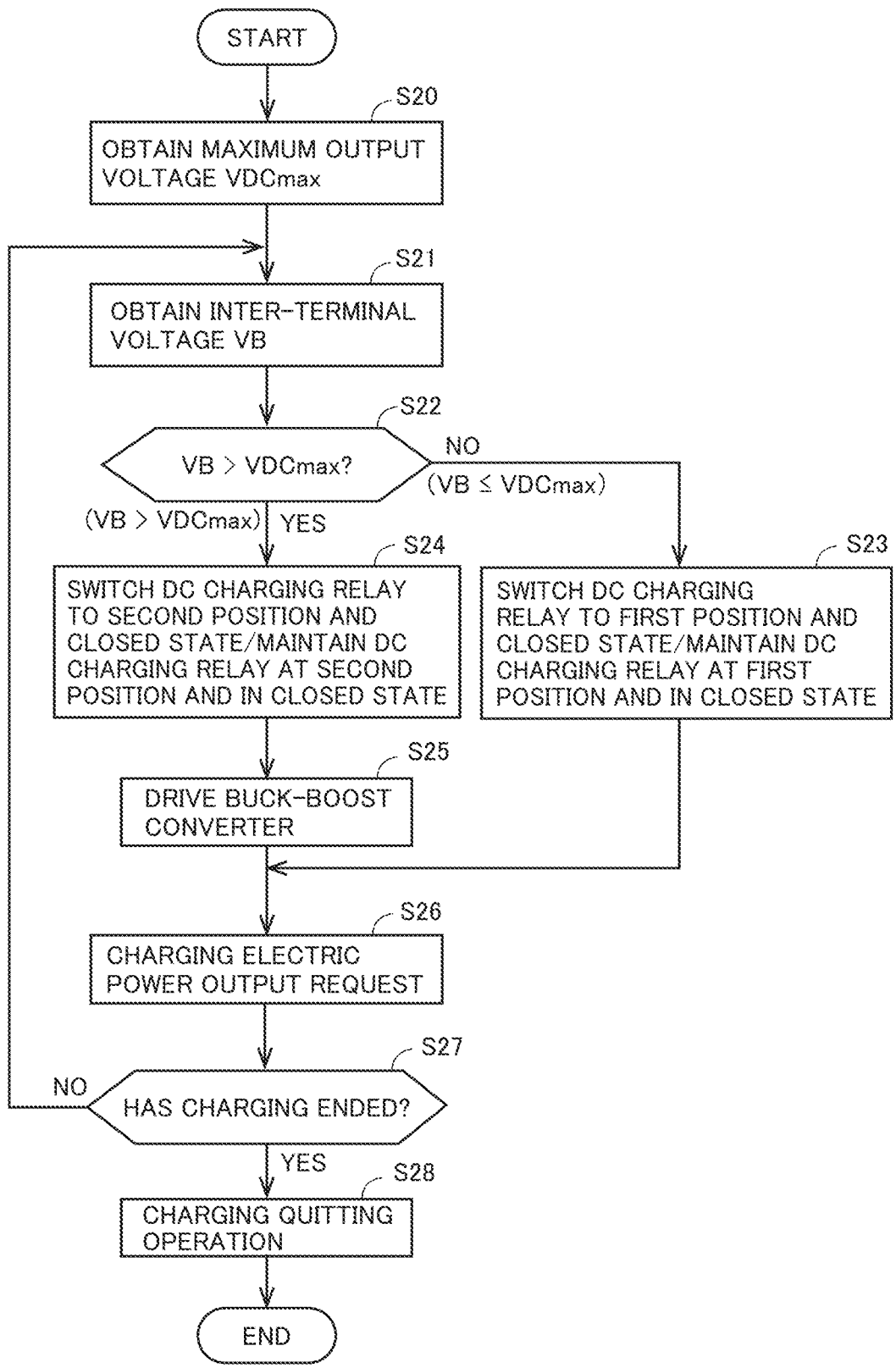
FIG. 10 is a schematic flowchart of processing performed by ECU 100 in the modification.

FIG. 10 is a flowchart showing overview of processing performed by ECU 100 in the modification. This flowchart is performed when connector 91 is connected to a DC inlet 51. When connector 91 is connected to DC inlet 51, initially, in S20, ECU 100 receives information from DC charging facility 90 through CAN communication or PLC and obtains maximum output voltage VDCmax of DC charging facility 90 from this information. The process proceeds to S21. Maximum output voltage VDCmax corresponds to the "maximum voltage" in the present disclosure.

In S21, ECU 100 receives a signal from monitoring unit 11 and obtains inter-terminal voltage VB of battery 10 from this signal. The process proceeds to S22.

In S22, ECU 100 determines whether or not inter-terminal voltage VB is higher than maximum output voltage VDCmax of DC charging facility 90. When inter-terminal voltage VB is equal to or lower than maximum output voltage VDCmax (VB≤VDCmax), determination as NO is made and the process proceeds to S23.

In S23, ECU 100 switches c contact relay 50a of DC charging relay 50 to the first position (when the DC charging relay has been set to the first position, the first position is maintained) and closes a contact relay 50b (when the a contact relay has been closed, the closed state is maintained). Thus, electric power provided from DC inlet 51 can be supplied to power line PL1 and power line PN1 (connected to power line PN2) on the high-voltage side of buck-boost converter 20 through power line Lc2 and power line Ld1. Power line Lc2 and power line Ld1 correspond to the "first path" or the "DC first path" in the present disclosure. After ECU 100 performs processing S23, the process proceeds to S26.

When inter-terminal voltage VB is higher than maximum output voltage VDCmax (VB>VDCmax) in S22, determination as YES is made and the process proceeds to S24. In S24, ECU 100 switches c contact relay 50a of DC charging relay 50 to the second position (when the DC charging relay has been set to the second position, the second position is maintained) and closes a contact relay 50b (when the a contact relay has been closed, the closed state is maintained). Electric power supplied from DC inlet 51 can thus be supplied to power line PL2 and power line PN2 on the low-voltage side of buck-boost converter 20 through power line Lc1 and power line Ld1. Power line Lc1 and power line Ld1 correspond to the "second path" or the "DC second path" in the present disclosure. After ECU 100 performs processing in S24, the process proceeds to S25.

In S25, ECU 100 activates buck-boost converter 20. Electric power provided to power line PL2 and power line PN2 on the low-voltage side is thus boosted and can be provided to power lines PL1 and PN1 on the high-voltage side.

In S26, ECU 100 transmits a request for output to DC charging facility 90 and carries out charging of battery 10 (while electric power is supplied from DC charging facility 90, the ECU continues supply of electric power). Charging of battery 10 may be CC charging or CCCV charging.

In following S27, ECU 100 determines whether or not charging of battery 10 has ended. For example, when the SOC of battery 10 attains to a charging completion SOC, ECU 100 determines that charging has ended. When it is determined that charging has not ended, the process proceeds to S21 and processing in S21 to S27 is repeatedly performed. When the SOC of battery 10 attains to the charging completion SOC and determination as YES is made in S27, the process proceeds to S28.

After ECU 100 performs the charging quitting operation in S28, ECU 100 quits the present routine. The charging quitting operation is, for example, transmission of a request for stopping charging electric power to DC charging facility 90 for stopping supply of electric power from DC charging facility 90 and opening (OFF) of a contact relay 50b. When ECU 100 has activated buck-boost converter 20 in S25, it deactivates buck-boost converter 20.

According to this modification, when the SOC of battery 10 is low and inter-terminal voltage VB is equal to or lower than maximum output voltage VDCmax of DC charging facility 90, DC charging relay 50 is switched such that electric power supplied from DC inlet 51 is supplied to power lines PL1 and PN1 on the high-voltage side of buck-boost converter 20. Since maximum output voltage VDCmax is higher than inter-terminal voltage VB, battery 10 can be charged with output electric power from DC charging facility 90 without activation of buck-boost converter 20. Thus, when battery 10 is chargeable without the use of the boost function of buck-boost converter 20, charging is carried out without the use of buck-boost converter 20.

Consequently, battery 10 can be charged without loss in buck-boost converter 20 and lowering in efficiency in charging can be suppressed.

When charging of battery 10 proceeds and the SOC is high, when the SOC at the time of start of charging is high, or when maximum output voltage VDCmax of DC charging facility 90 is low, inter-terminal voltage VB becomes higher than maximum output voltage VDCmax. In this case, DC charging relay 50 is switched such that electric power supplied from DC inlet 51 is supplied to power lines PL2 and PN2 on the low-voltage side of buck-boost converter 20. Then, the voltage of output electric power from DC charging facility 90 is boosted by buck-boost converter 20, electric power of the boosted voltage is supplied to battery 10, and the battery is charged therewith. Thus, when the output voltage of DC charging facility 90 is lower than inter-terminal voltage VB, battery 10 can be charged by using the boost function of buck-boost converter 20.

In the modification, when inter-terminal voltage VB is equal to or lower than maximum output voltage VDCmax (VB≤VDCmax) in S22, the process proceeds to S23. The process may proceed to S23 when inter-terminal voltage VB is lower than maximum output voltage VDCmax (VB<VDCmax). In this case, the process proceeds to S24 when inter-terminal voltage VB is equal to or higher than maximum output voltage VDCmax (VB≥VDCmax).

Figure 11:
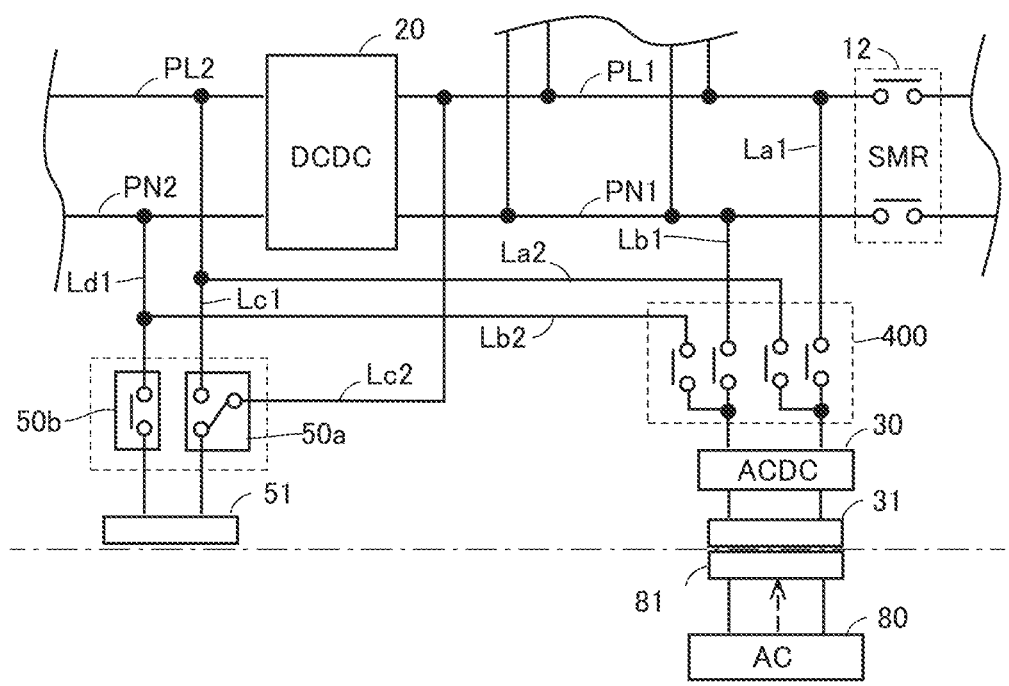
FIG. 11 is a diagram showing another exemplary configuration of an AC charging relay.

In the present embodiment, AC charging relay 40 is composed of c contact relay 40a and c contact relay 40b. The configuration of AC charging relay 40, however, is not limited as such. FIG. 11 is a diagram showing another exemplary configuration of an AC charging relay. As shown in FIG. 11, the charging relay may be a charging relay 400 composed of four a contact relays. Since AC charging relay 400 is composed of four a contact relays, electrical connection between electric power discharged from battery 10 and AC inlet 31 is reliably cut off when connector 81 is not connected to AC inlet 31 and all a contact relays are opened (OFF). Similarly, c contact relay 50a of DC charging relay 50 may be composed of two a contact relays.

In the present embodiment, power line La1 is connected to power line PL2 through power line Lc1 and power line Lb2 is connected to power line PN2 through power line Ld1. A layout of each power line is not limited as such. For example, power line La2 may directly be connected to power line PL2 and power line Lb2 may directly be connected to power line PN2. a contact relay 50b of DC charging relay 50 may be replaced with the c contact relay. This c contact relay may be switched such that electric power provided to DC inlet 51 is selectively supplied to power line PN2 or power line PN1.

In the present embodiment, the voltage (the rated voltage or the nominal voltage) of battery 10 is set to 800 V, however, it may be set to 500 V, 600 V, or 700 V. Electrically powered vehicle V in the present embodiment is a four-wheel-drive vehicle in which the front wheels and the rear wheels are driven by the MG, however, it may be a two-wheel-drive vehicle in which either the front wheels or the rear wheels are driven by the MG.

Though electrically powered vehicle V shown in FIG. 1 is a battery electric vehicle, a vehicle to which the present disclosure is applicable is not limited to electrically powered vehicle V. The present disclosure is applicable, for example, also to a plug-in hybrid electric vehicle including an engine and a motor generator, an externally chargeable fuel cell electric vehicle including a storage battery, or an industrial vehicle such as a forklift.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. An electrically powered vehicle, comprising:
a power storage device chargeable with electric power supply supplied from an external power supply;
a voltage sensor configured to detect an inter-terminal voltage of the power storage device;
a booster having a high-voltage side connected to the power storage device, the booster being configured to boost a voltage of electric power provided to a low-voltage side of the booster and to provide electric power of the boosted voltage to the high-voltage side;
a first path through which the electric power supplied from the external power supply is supplied to the high-voltage side of the booster;
a second path through which the electric power supplied from the external power supply is supplied to the low-voltage side of the booster;
a charging relay configured to selectively switch a path for the electric power supplied from the external power supply to the first path or the second path; and
a controller configured to control the charging relay in accordance with the inter-terminal voltage of the power storage device detected by the voltage sensor, wherein
the controller is configured to
control the charging relay to select the first path in response to the power storage device being charged with the electric power supplied from the external power supply and the inter-terminal voltage of the power storage device detected by the voltage sensor being lower than a voltage of the electric power supplied from the external power supply, and
switch the charging relay such that the path for the electric power is changed from the first path to the second path, and to activate the booster, in response to the power storage device being charged with the electric power supplied from the external power supply and the inter-terminal voltage of the power storage device detected by the voltage sensor exceeding the voltage of the electric power supplied from the external power supply.

2. The electrically powered vehicle according to claim 1, wherein
the external power supply is an AC power supply configured to supply AC electric power to the electrically powered vehicle,
the electrically powered vehicle further comprises a charger configured to convert the AC electric power supplied from the AC power supply to DC electric power,
the first path is a path through which the DC electric power provided from the charger is supplied to the high-voltage side of the booster,
the second path is a path through which the DC electric power provided from the charger is supplied to the low-voltage side of the booster, and
the controller is configured to
control the charging relay to select the first path in response to the inter-terminal voltage of the power storage device detected by the voltage sensor being lower than a voltage of the DC electric power provided from the charger, and switch the charging relay such that the path for the DC electric power is changed from the first path to the second path, and to activate the booster, in response to the inter-terminal voltage of the power storage device detected by the voltage sensor exceeding the voltage of the DC electric power provided from the charger.

3. The electrically powered vehicle according to claim 2, wherein the controller is configured to control the charging relay to select the first path in response to the inter-terminal voltage of the power storage device detected by the voltage sensor being lower than an upper limit voltage which is an upper limit of the voltage provided from the charger, and switch the charging relay such that the path for the DC electric power is changed from the first path to the second path, and to activate the booster, in response to the inter-terminal voltage of the power storage device detected by the voltage sensor exceeding the upper limit voltage.

4. The electrically powered vehicle according to claim 1, wherein the external power supply is a DC power supply configured to supply DC electric power to the electrically powered vehicle, the electrically powered vehicle further comprises a DC inlet configured to receive input of the DC electric power supplied from the DC power supply, the first path is a path through which the DC electric power provided to the DC inlet is supplied to the high-voltage side of the booster, the second path is a path through which the DC electric power provided to the DC inlet is supplied to the low-voltage side of the booster, and the controller is configured to control the charging relay to select the first path in response to the inter-terminal voltage of the power storage device detected by the voltage sensor being lower than a voltage of the DC electric power supplied from the DC power supply, and switch the charging relay such that the path for the DC electric power is changed from the first path to the second path, and to activate the booster, in response to the inter-terminal voltage of the power storage device detected by the voltage sensor exceeding the voltage of the DC electric power supplied from the DC power supply.

5. The electrically powered vehicle according to claim 4, wherein the controller is configured to control the charging relay to select the first path in response to the inter-terminal voltage of the power storage device detected by the voltage sensor being lower than a maximum voltage which is maximum of the voltage of the DC electric power supplied from the DC power supply, and switch the charging relay such that the path for the DC electric power is changed from the first path to the second path, and to activate the booster, in response to the inter-terminal voltage of the power storage device detected by the voltage sensor exceeding the maximum voltage.

6. The electrically powered vehicle according to claim 1, wherein the external power supply is an AC power supply configured to supply AC electric power to the electrically powered vehicle or a DC power supply configured to supply DC electric power to the electrically powered vehicle, the electrically powered vehicle further comprises:

a DC inlet configured to receive input of the DC electric power supplied from the DC power supply;

a first DC path through which the DC electric power provided to the DC inlet is supplied to the high-voltage side of the booster;

a second DC path through which the DC electric power provided to the DC inlet is supplied to the low-voltage side of the booster;

a DC charging relay configured to selectively switch a path for the DC electric power supplied from the DC power supply to the first DC path or the second DC path; and a charger configured to convert the AC electric power supplied from the AC power supply to DC electric power, the first path is a path through which the DC electric power provided from the charger is supplied to the high-voltage side of the booster, the second path is a path through which the DC electric power provided from the charger is supplied to the low-voltage side of the booster, the controller is configured to control the DC charging relay to select the first DC path in response to the power storage device being charged with the DC electric power provided to the DC inlet and the inter-terminal voltage of the power storage device detected by the voltage sensor being lower than a voltage of the DC electric power supplied from the DC power supply, and switch the DC charging relay such that the path for the DC electric power is changed from the first DC path to the second DC path, and to activate the booster, in response to the power storage device being charged with the DC electric power provided to the DC inlet and the inter-terminal voltage of the power storage device detected by the voltage sensor exceeding the voltage of the DC electric power supplied from the DC power supply, and the controller is configured to control the charging relay to select the first path in response to the power storage device being charged with the DC electric power provided from the charger and the inter-terminal voltage of the power storage device detected by the voltage sensor being lower than a voltage of the DC electric power provided from the charger, and switch the charging relay such that the path for the DC electric power is changed from the first path to the second path, and to activate the booster, in response to the power storage device being charged with the DC electric power provided from the charger and the inter-terminal voltage of the power storage device detected by the voltage sensor exceeding the voltage of the DC electric power provided from the charger.

7. The electrically powered vehicle according to claim 6, wherein the controller is configured to control the DC charging relay to select the first DC path in response to the power storage device being charged with the DC electric power provided to the DC inlet and the inter-terminal voltage of the power storage device detected by the voltage sensor being lower than a maximum voltage which is maximum of the voltage of the DC electric power supplied from the DC power supply, and switch the DC charging relay such that the path for the DC electric power is changed from the first DC path to the second DC path, and to activate the booster, in response to the power storage device being charged with the DC electric power provided to the DC inlet and the inter-terminal voltage of the power storage device detected by the voltage sensor exceeding the maximum voltage, and the controller is configured to control the charging relay to select the first path in response to the power storage device being charged with the DC electric power provided from the charger and the inter-terminal voltage of the power storage device detected by the voltage sensor being lower than an upper limit voltage which is an upper limit of the voltage provided from the charger, and switch the charging relay such that the path for the DC electric power is changed from the first path to the second path, and to activate the booster, in response to the power storage device being charged with the DC electric power provided from the charger and the inter-terminal voltage of the power storage device detected by the voltage sensor exceeding the upper limit voltage.

8. The electrically powered vehicle according to claim 1, wherein the booster is a buck-boost converter, and the buck-boost converter is configured to boost the voltage of electric power provided to the low-voltage side and provide the boosted voltage to the high-voltage side, and lower the voltage of electric power provided to the high-voltage side and provide the lowered voltage to the low-voltage side.

9. The electrically powered vehicle according to claim 8, further comprising auxiliary machinery connected to the low-voltage side of the buck-boost converter.

10. A method of controlling charging of an electrically powered vehicle, the electrically powered vehicle including a charger that converts AC electric power supplied from an external power supply to DC electric power, a power storage device chargeable with the DC electric power provided from the charger, a voltage sensor that detects an inter-terminal voltage of the power storage device, a booster, the booster having a high-voltage side connected to the power storage device, the booster being configured to boost a voltage of the DC electric power provided to a low-voltage side of the booster and to provide the DC electric power of the boosted voltage to the high-voltage side, a first path through which the DC electric power provided from the charger is supplied to the high-voltage side of the booster, a second path through which the DC electric power provided from the charger is supplied to the low-voltage side of the booster, and a charging relay that selectively switches a path for the DC electric power provided from the charger to the first path or the second path, the method comprising:

obtaining the inter-terminal voltage of the power storage device detected by the voltage sensor during an operation of the charger;

comparing an upper limit voltage which is an upper limit of a voltage provided from the charger with the inter-terminal voltage detected by the voltage sensor during the operation of the charger;

charging the power storage device by controlling the charging relay to select the first path without activation of the booster in response to the inter-terminal voltage detected by the voltage sensor during the operation of the charger being lower than the upper limit voltage; and charging the power storage device by switching the charging relay such that the path for the DC electric power is changed from the first path to the second path, and activating the booster, in response to the inter-terminal voltage detected by the voltage sensor during the operation of the charger exceeding the upper limit voltage.

\* \* \* \* \*